United States Patent
ten Have et al.

(10) Patent No.: US 10,429,597 B2
(45) Date of Patent: Oct. 1, 2019

(54) INTERPOSER ASSEMBLIES AND ARRANGEMENTS FOR COUPLING AT LEAST ONE OPTICAL FIBER TO AT LEAST ONE OPTOELECTRONIC DEVICE

(71) Applicant: CORNING OPTICAL COMMUNICATIONS LLC, Hickory, NC (US)

(72) Inventors: Eric Stephan ten Have, Berlin (DE); Andrey Kobyakov, Painted Post, NY (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/114,775

(22) Filed: Aug. 28, 2018

(65) Prior Publication Data

US 2018/0364426 A1    Dec. 20, 2018

Related U.S. Application Data

(63) Continuation of application No. PCT/US2017/019267, filed on Feb. 24, 2017.

(Continued)

(51) Int. Cl.
  *G02B 6/42*   (2006.01)
  *G02B 6/30*   (2006.01)
  (Continued)

(52) U.S. Cl.
  CPC .......... *G02B 6/4213* (2013.01); *G02B 6/126* (2013.01); *G02B 6/14* (2013.01); *G02B 6/30* (2013.01);
  (Continued)

(58) Field of Classification Search
  CPC ........ G02B 6/30; G02B 6/4214; G02B 6/126; G02B 6/14; G02B 6/3897; G02B 6/4213; G02B 6/42; G02B 6/4244; G02B 6/4292
  See application file for complete search history.

(56) References Cited

U.S. PATENT DOCUMENTS 7,162,124 B1   1/2007   Gunn, III et al.
7,366,380 B1   4/2008   Peterson et al.
(Continued)

FOREIGN PATENT DOCUMENTS

EP   389172 B1   10/1995
EP   2259113 A1   12/2010
(Continued)

OTHER PUBLICATIONS

Barwicz et al; "Low-Cost Interfacing of Fibers to Nanophotonic Waveguides: Design for Fabrication and Assembly Tolerances", IEEE Photonics Journal, vol. 6, No. 4, Paper 6600818, Aug. 2014; 19 Pages.

(Continued)

*Primary Examiner* — Thomas A Hollweg
*Assistant Examiner* — Mary A El-Shammaa
(74) *Attorney, Agent, or Firm* — Adam R. Weeks

(57) ABSTRACT

Interposer assemblies and arrangements for coupling at least one optical fiber to at least one optoelectronic device are disclosed. Interposer assemblies comprise an interposer including at least one optical waveguide comprising a first end and a second end, and a substrate comprising the at least one optoelectronic device, at least one optical receiving/emitting element and at least one optical channel. The interposer and the substrate are in optical communication so that light coupled out of the at least one optical waveguide is coupled in the at least one optical receiving/emitting element and/or light coupled out of the at least one optical (Continued)

receiving/emitting element is coupled in the at least one optical waveguide of the interposer.

23 Claims, 10 Drawing Sheets

Related U.S. Application Data

(60) Provisional application No. 62/302,438, filed on Mar. 2, 2016.

(51) Int. Cl.
    *G02B 6/38* (2006.01)
    *G02B 6/126* (2006.01)
    *G02B 6/14* (2006.01)

(52) U.S. Cl.
    CPC ............ *G02B 6/3897* (2013.01); *G02B 6/42* (2013.01); *G02B 6/423* (2013.01); *G02B 6/4214* (2013.01); *G02B 6/4244* (2013.01); *G02B 6/4292* (2013.01)

(56) References Cited

U.S. PATENT DOCUMENTS

| | | | |
|---|---|---|---|
| 8,064,745 B2 | 11/2011 | Fortusini et al. | |
| 8,855,452 B2 | 10/2014 | Andry et al. | |
| 9,453,969 B2 | 9/2016 | Kobyakov et al. | |
| 9,520,946 B2 | 12/2016 | Peng et al. | |
| 9,768,901 B2 * | 9/2017 | Soldano | G02B 6/30 |
| 9,933,577 B2 * | 4/2018 | Gambino | G02B 6/34 |
| 10,018,788 B2 * | 7/2018 | Mathai | G02B 6/428 |
| 10,026,723 B2 * | 7/2018 | Evans | G02B 6/12004 |
| 2006/0088246 A1 | 4/2006 | Han et al. | |
| 2006/0215963 A1 | 9/2006 | Hamano | |
| 2012/0328236 A1 | 12/2012 | Nasu et al. | |
| 2013/0195396 A1 | 8/2013 | Julien et al. | |
| 2014/0010498 A1 * | 1/2014 | Verslegers | G02B 5/1861 385/37 |
| 2014/0294342 A1 | 10/2014 | Offrein et al. | |
| 2017/0031115 A1 | 2/2017 | Schaevitz et al. | |

FOREIGN PATENT DOCUMENTS

| | | |
|---|---|---|
| WO | 2014093616 A1 | 6/2014 |
| WO | 2016077500 A2 | 5/2016 |

OTHER PUBLICATIONS

Childers et al; "New Single-Mode, Multi-Fiber, Expanded-Beam, Passive Optical Interconnect"; Proc. of SPIE, vol. 8991; (2014); pp. 89910J-1-89910J-14.

Gunn et al; "Silicon Photonics"; Optical Fiber Telecommunications V A, pp. 381-429, Elsevier 2008.

International Invitation to Pay Additional Fees of the International Searching Authority; PCT/US2017/019267; dated May 15, 2017; 15 Pages; European Patent Office.

International Search Report and Written Opinion of the International Searching Authority; PCT/US2017/019267; dated Sep. 8, 2017; 25 Pages; European Patent Office.

Kim et al; "Pluggable Compact Optical Connector for Si-Photonics Chip Using MT-Ferrule," Proc. SPIE 7943, Silicon Photonics VI, pp. 79430P-1-79430P-7; (2011).

Lapointe et al; "Making Smart Phone Smarter With Photonics"; Opt. Express Vo. 22, No. 13, p. 15473 (2014).

Mekis et al; "A Grating-Coupler-Enabled CMOS Photonics Platform"; IEEE J. Sel. Top. Quant. El. 17(3), 597-608 (2011).

Mitchell et al; "57 Channel (19×3) Spatial Multiplexer Fabricated Using Direct Laser Inscription"; OFC 2014; M3K.5; 3 Pages.

Schmidtke et al; "960 Gb/s Optical Backplane Ecosystem Using Embedded Polymer Waveguides and Demonstration in a 12G SAS Storage Array"; IEEE J. Lightwave Technol. vol. 31, No. 24 p. 3970 (2013).

Shani et al; "Integrated Optic Adiabatic Devices on Silicon"; IEEE Journal of Quantum Electronics; vol. 27; No. 3; Mar. 1991; p. 556-566.

Silicon Photonics Course; Helios Project; 1 Page; Downloaded Nov. 7, 2018; http://www.helios-project.eu/Download/Silicon-photonics-course/.

Van Uden et al; "Ultra-High-Density Spatial Division Multiplexing With a Few-Mode Multicore Fibre", Nature Photonics; vol. 8, 2014; pp. 865-870.

Zaoui et al; "Bridging the Gap Between Optical Fibers and Silicon Photonics Integration Circuits"; Opt. Express vol. 22, No. 2 1277 (2014).

* cited by examiner

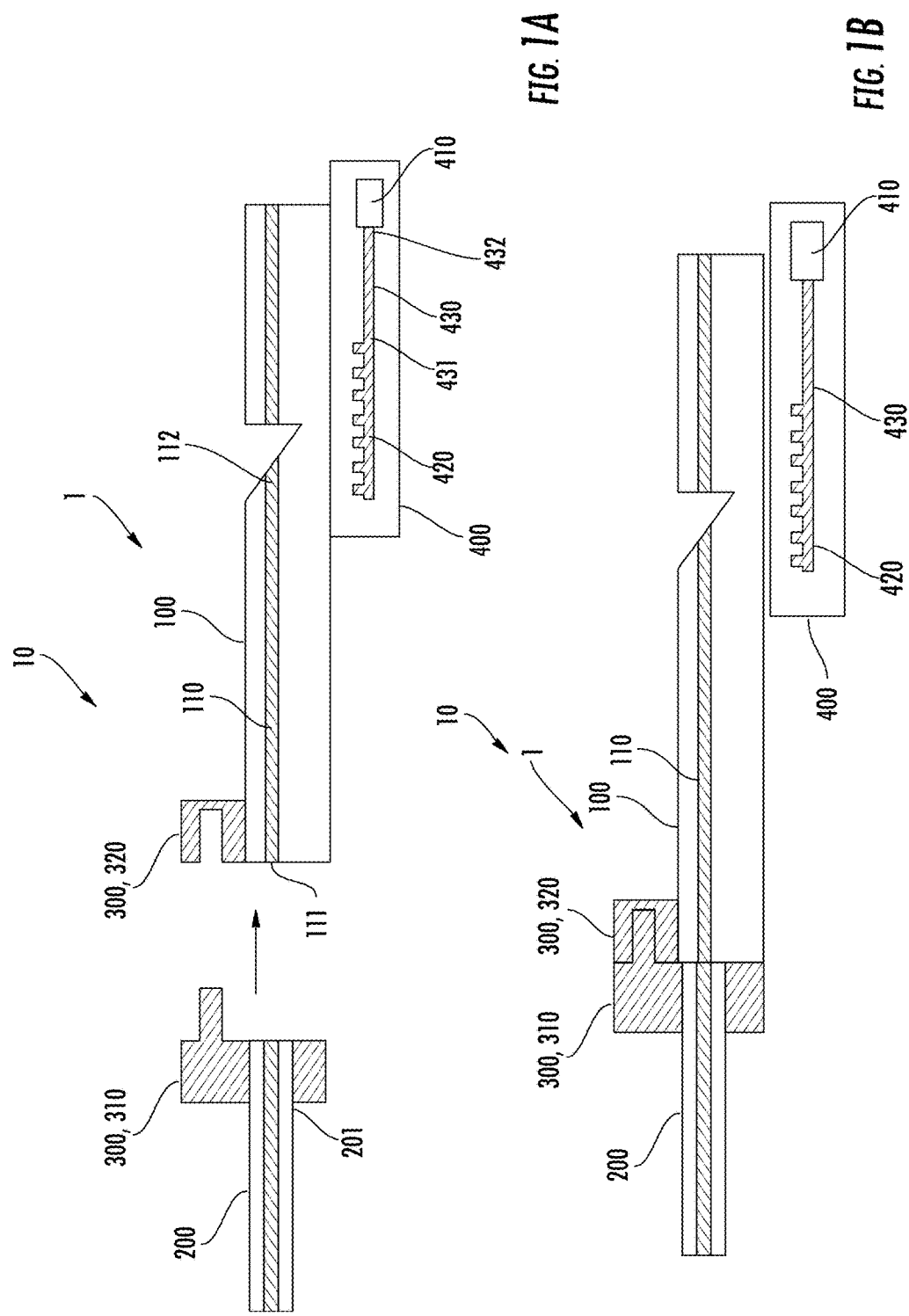

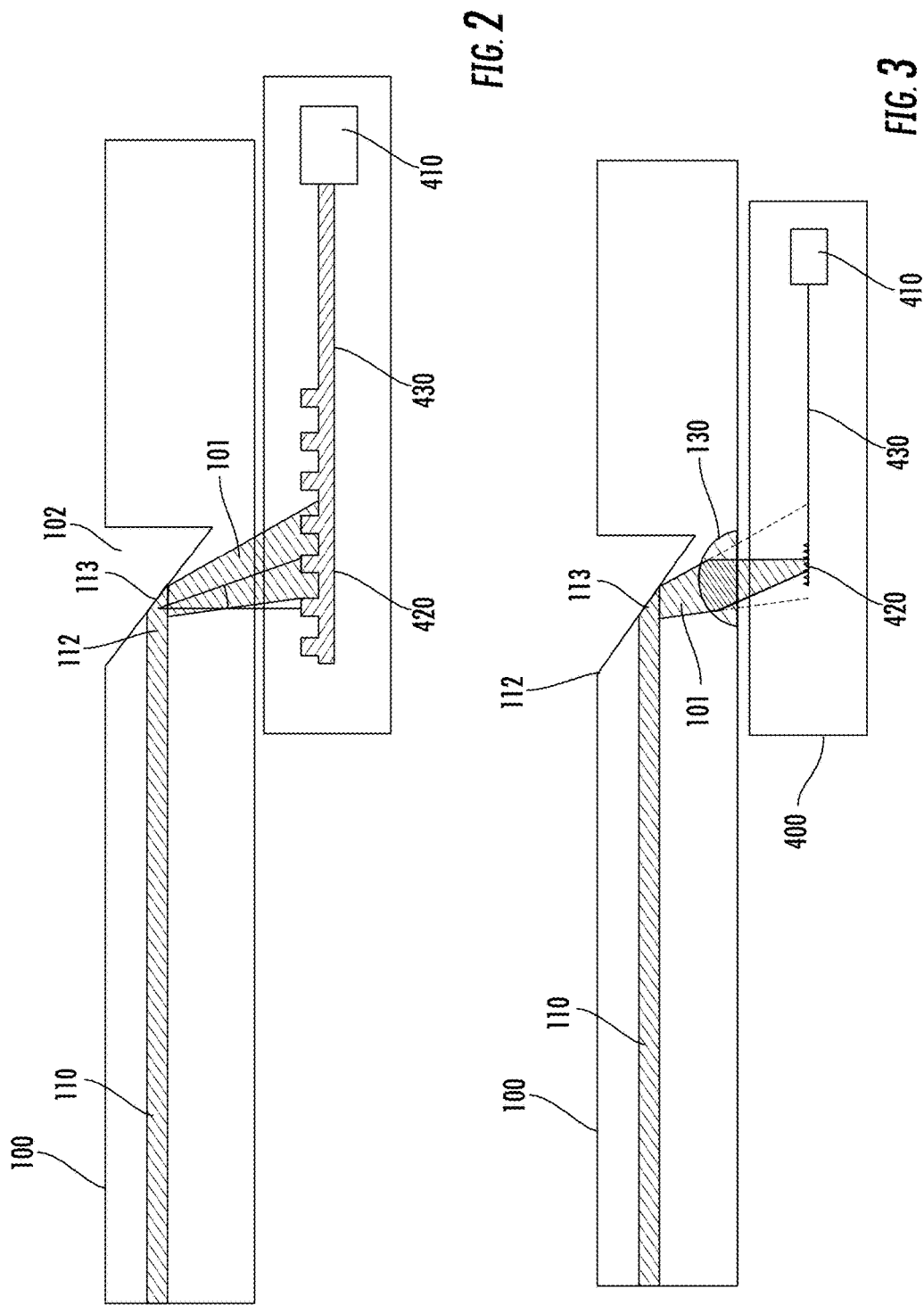

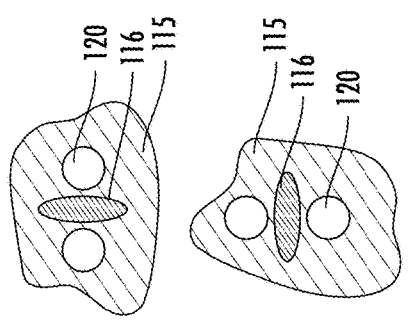
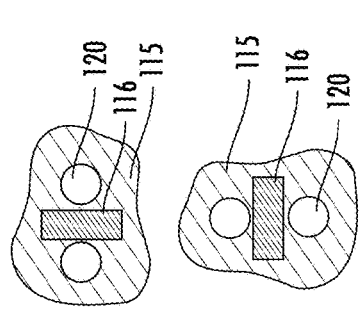
FIG. 5A
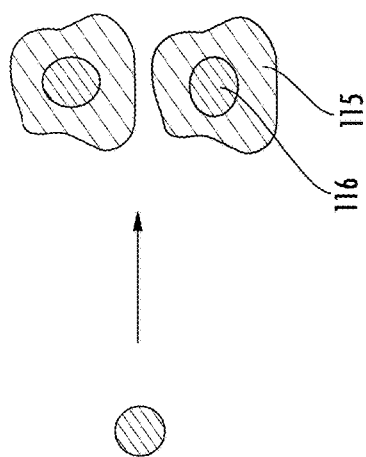
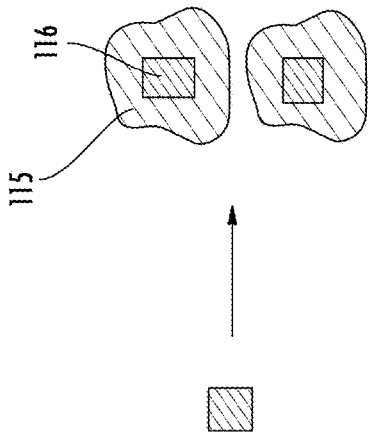
FIG. 5B

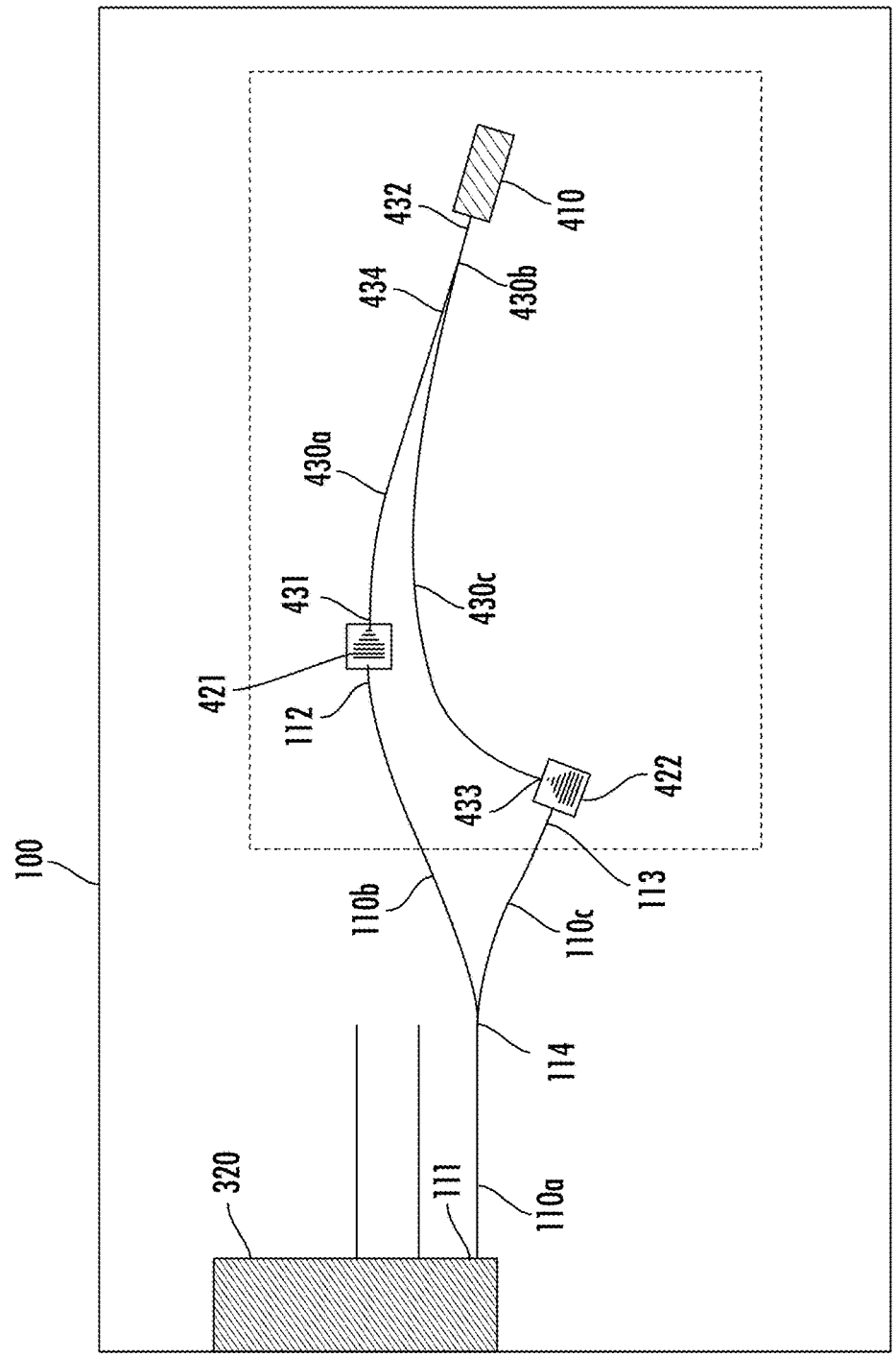

x: 0°
y: 41° x: -4°
y: 45°

US 10,429,597 B2

INTERPOSER ASSEMBLIES AND ARRANGEMENTS FOR COUPLING AT LEAST ONE OPTICAL FIBER TO AT LEAST ONE OPTOELECTRONIC DEVICE

PRIORITY APPLICATIONS

This application is a continuation of International Application No. PCT/US17/19267, filed Feb. 24, 2017, and claims the benefit of priority to U.S. Application No. 62/302,438, filed Mar. 2, 2016, both applications being incorporated herein by reference.

FIELD

An interposer assembly for coupling at least one optical fiber to at least one optoelectronic device which may be integrated in a substrate, for example a SiP (Silicon Photonics) chip is disclosed. Also disclosed and arrangement and a method for making the arrangement for coupling at least one optical fiber to at least one optoelectronic device using the interposer assemblies disclosed.

BACKGROUND

Optoelectronic devices, for example photonic integrated circuits (PICs) may be provided in a substrate and manufactured by Silicon Photonics (SiP) technology. Silicon Photonics promises numerous advantages of integrated optical circuits, but continues to suffer from difficulties of coupling light to and from these photonic integrated circuits. Therefore, input-output coupling remains a prerequisite for commercialization of SiP technology.

There are two main technologies that are used for fiber-to-chip coupling. The first technology is based on the use of grating couplers that receive and emit light vertically with respect to the plane of the photonic integrated circuits. The second technology uses edge couplers that terminate waveguides at an edge of the photonic integrated circuits. These fiber-to-chip coupling technologies have their advantages and challenges.

Grating couplers, for example, offer high coupling efficiency, low footprint on a chip, and access to virtually any place on the chip. However, they require fibers to be arranged nearly perpendicularly to the surface of the chip. A method based on the use of grating couplers implies active alignment and results in a non-flat form factor, especially highly undesirable in Data Center applications. Additionally, grating couplers are polarization-sensitive or require complicated and lossy dual-polarization gratings for in-coupled light. Finally, the optical fibers need to be placed with an accuracy of about one micron on the surface of the chip to limit coupling losses.

Edge coupling shares the polarization and accuracy requirements, but here, the fibers are arranged in the plane of the photonic integrated circuits, so that no exorbitant heights of the whole assembly are required, resulting in compact solutions. Another big advantage of side coupling is its extensibility to multi-fiber coupling solutions. However, the mode-fields of Si waveguides, which measure only a few hundreds of nanometers in size, do not match the mode-field of standard single-mode fibers (about 10 µm), so that 3D spot-size converters are required for decent coupling efficiency. To enable coupling with low loss, these converters must be adiabatic, thus requiring a lot of space on a chip comprising the photonic integrated circuit or any additional chip that drives the cost of the photonic integrated circuit and nullifies its compactness.

There is a desire to provide an arrangement for coupling at least one optical fiber to at least one optoelectronic device with low loss. There is also an unresolved need for providing a method to manufacture an arrangement for coupling at least one optical fiber to at least one optoelectronic device with low loss.

SUMMARY

An arrangement for coupling at least one optical fiber to at least one optoelectronic device comprises an interposer including at least one optical waveguide having a first end to be optically coupled to the at least one optical fiber and a second end. The arrangement further comprises a coupling device to optically couple the at least one optical fiber to the interposer and to align the at least one optical fiber to the at least one optical waveguide to transfer light between the at least one optical fiber and the at least one optical waveguide. A first portion of the coupling device is provided at an end of the at least one optical fiber and a second portion of the coupling device is disposed at the interposer such that the at least one optical fiber is mechanically coupled to an edge of the interposer, when the first portion of the coupling element is mechanically coupled to the second portion of the coupling device. The second end of the at least one optical waveguide is configured to couple the light in/out of the at least one optical waveguide.

The arrangement further comprises a substrate comprising the at least one optoelectronic device, at least one optical receiving/emitting element and at least one optical channel having a first end being optically connected to the at least one optical receiving/emitting element to couple light in/out of the at least one optical channel and a second end, wherein the at least one optoelectronic device is optically connected to the second end of the at least one optical channel. The interposer and the substrate are arranged so that light coupled out of the at least one optical waveguide at the second end of the at least one optical waveguide is coupled in the at least one optical receiving/emitting element and/or light coupled out of the at least one optical receiving/emitting element is coupled in the at least one optical waveguide at the second end of the at least one optical waveguide.

The first portion of the coupling device may be embodied as a pluggable, multi-fiber connector that edge couples to the interposer by means of the second portion of the coupling device that may be embodied as a receptacle. The interposer may be made of glass, silicon, polymer, or other material. The interposer may comprise an array of waveguides, mode-matched to the at least one optical fiber. The at least one optical fiber may be configured as a single mode fiber (SMF) or a multi-mode fiber (MMF).

In order to couple light in/out of the at least one optical waveguide, the end face at the second end of the at least one optical waveguide may be embodied as an angled mirror to provide total internal reflection (TIR) of the light transferred within the core of the at least one optical waveguide so that the light is directed towards the at least one optical receiving/emitting element on the substrate, for example a chip. The substrate may be mounted below the lower surface of the interposer. The at least one optical receiving/emitting element may be configured as a grating structure of a grating coupler or a VCSEL or a photodiode. Depending on the thickness of the interposer, a focusing element such as an optical lens may be provided in the material of the interposer. The focusing element is configured to focus the light reflected at the end face of the second end of the at least one optical waveguide onto the at least one optical receiving/emitting element of the substrate.

A method to manufacture an arrangement for coupling at least one optical fiber to at least one optoelectronic device comprises a step of providing a first wafer comprising at least one first fiducial and a plurality of the interposers, and providing a second wafer comprising at least one second fiducial and a plurality of the substrates. The first wafer and the second wafer are aligned by means of the at least one first fiducial and the at least one second fiducial such that a respective one of the plurality of interposers of the first wafer and a respective one of the plurality of substrates of the second wafer are arranged so that light coupled out of the at least one optical waveguide of the respective one of the plurality of interposers at the second end of the at least one optical waveguide is coupled in the at least one optical receiving/emitting element of the respective one of the plurality of substrates and/or light coupled out of the at least one optical receiving/emitting element of the respective one of the plurality of substrates is coupled in the at least one optical waveguide of the respective one of the plurality of interposers at the second end of the at least one optical waveguide. According to a subsequent step, each pair of the respective one of the plurality of interposers and the respective one of the plurality of substrates is singularized.

While the first wafer comprises the plurality of interposers, the second wafer comprises the substrates/chips including the at least one optoelectronic device that may be embodied as a photonic integrated circuit. The first and second wafer are stacked and aligned before dicing the wafer stack. The wafer stack manufacturing method refers to the processing of components on the wafer-level, i.e. each step of the process is applied to the entire first and second wafer that may contain up to tens of thousands of components.

The alignment and attachment of the photonic integrated circuits to the interposer containing the at least one waveguide may be done on wafer-level, for example, using alignment marks/fiducials on both the first wafer including the interposers and the second wafer including the substrates/chips with the optoelectronic devices, for example the photonic integrated circuits. Furthermore, the manufacturing of the waveguides and the light-reflecting structure at the end face of the at least one waveguide may be done by using wafer-level processes, for example by ion exchange processes or laser writing processes. After completion of the process, the components are singularized for use. Processing entire wafers instead of individual components saves time and cost.

Also disclosed is an interposer assembly comprising an interposer comprising at least one optical waveguide with a first end and a second end, a coupling device attached to the interposer and used for optically coupling to the first end of the interposer, a substrate being in optical communication with the interposer, the substrate comprising the at least one optoelectronic device, at least one optical receiving/emitting element and at least one optical channel having a first end in optical communication with the at least one optical receiving/emitting element and a second end in optical communication with the at least one optoelectronic device (410), wherein a cross-section of the at least one optical waveguide (110) of the interposer (100) changes along the longitudinal direction of the at least one optical waveguide such that the first end has a first polarization of light the second end has a second polarization of light.

BRIEF DESCRIPTION OF THE DRAWINGS

FIG. 1A shows an unmated arrangement of an optical fiber, and an explanatory interposer assembly comprising an interposer and a substrate comprising an optoelectronic device;

FIG. 1B shows an arrangement of FIG. 1A an optical fiber coupled to an interposer assembly;

FIG. 2 shows the coupling of light from an optical waveguide of an interposer towards an optical receiving/emitting element of a substrate;

FIG. 3 shows an arrangement of an interposer and a substrate with an optical lens being arranged in the material of the interposer;

FIGS. 5A and 5B show the selection of polarization through the shape of the waveguide by adding air-filled passageways next to the longitudinal direction of the core of the optical waveguide;

FIG. 7 shows an embodiment of a layout of an interposer coupled to a substrate including at least one optoelectronic device;

DETAILED DESCRIPTION

Figure 4:
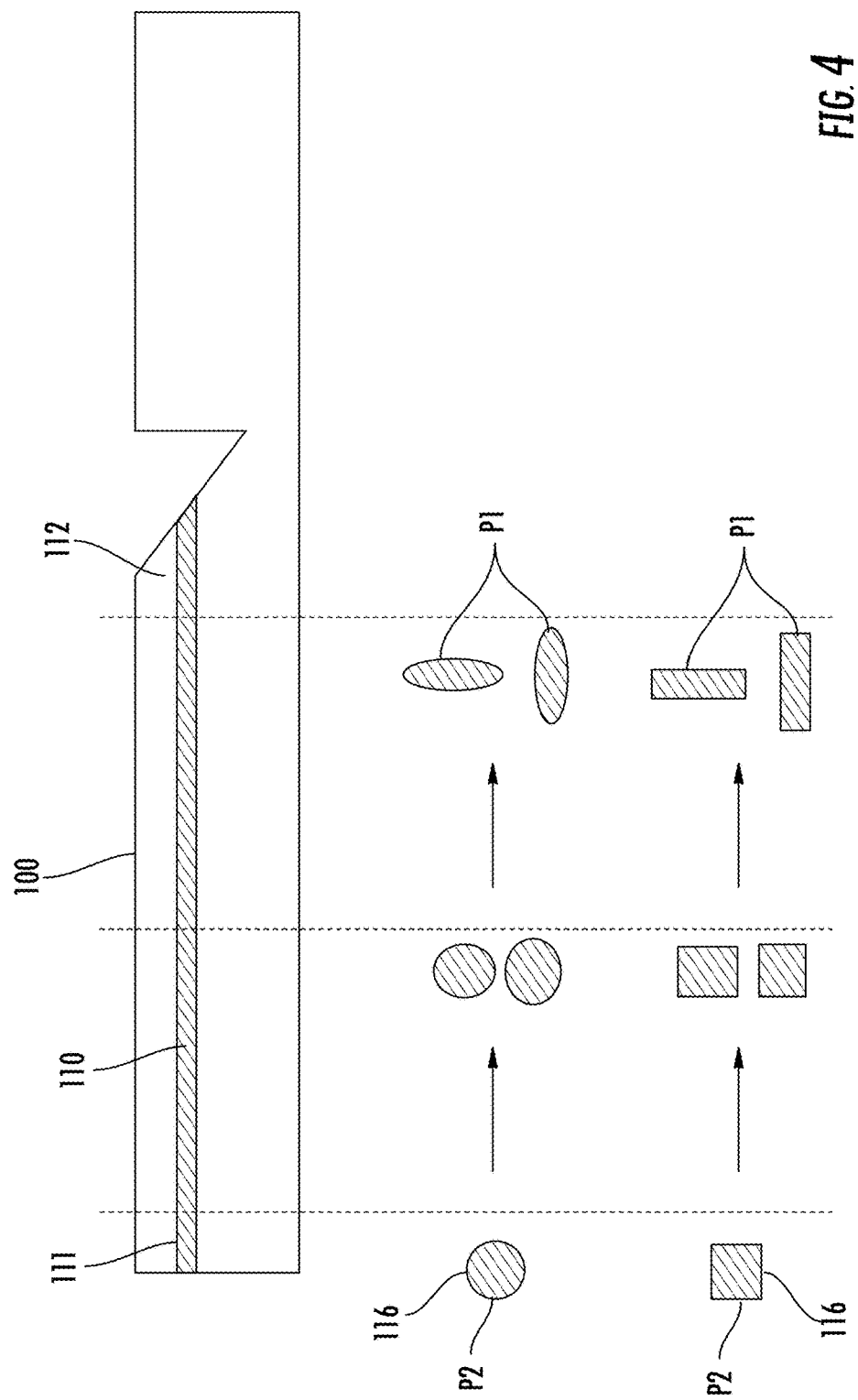
FIG. 4 illustrates the selection of a polarization of the possible polarizations of the light transferred in an optical waveguide by changing the shape of the cross-section of the waveguide.

FIGS. 1A and 1B show an explanatory arrangement 10 for coupling at least one optical fiber to at least one optoelectronic device in an unmated state (FIG. 1A) and in a mated state (FIG. 1B). The arrangement 10 is disclosed in detail to convey the operation and concepts of an interposer assembly 1. Interposer assembly 1 comprising an interposer 100 including at least one optical waveguide 110 having a first end 111 to be optically coupled to the at least one optical fiber 200 and a second end 112. The arrangement further comprises a coupling device 300 to optically couple the at least one optical fiber 200 to the interposer 100 and to align the at least one optical fiber 200 to the at least one optical waveguide 110 to transfer light between the at least one optical fiber 200 and the at least one optical waveguide 110.

The coupling device 300 comprises a first portion 310 being provided at an end 201 of the at least one optical fiber 200 and a second portion 320 being disposed at an edge of the interposer 100. The first and the second portion 310, 320 of the coupling device 300 are configured such that the at least one optical fiber 200 may be optically coupled to an edge of the interposer 100, when the first portion 310 of the coupling element is mechanically coupled to the second portion 320 of the coupling device 300.

The design of the coupling device 300 can vary. According to a possible embodiment of the arrangement 1, the coupling device 300 may be configured as a MTP/MPO or other interface. The first portion of the coupling device may be configured as one of a MT ferrule-based connector or a lens-based connector. The second portion 320 of the coupling device 300 may be configured as a receptacle. By way of example and not limitation, the MT ferrule-based connector may be a pinned physical contact connector and the lensed-based connector may be an expanded beam connector.

The second end 112 of the at least one optical waveguide 110 is configured to couple light in/out of the at least one optical waveguide 110. The arrangement further comprises a substrate 400 comprising the at least one optoelectronic device 410, for example, a photonic integrated circuit, at least one optical receiving/emitting element 420, for example a grating coupler, a VCSEL or a photodiode, and at least one optical channel 430. The at least one optical channel 430 may have a first end 431 being connected to the at least one optical receiving/emitting element 420 to couple light in/out of the at least one optical channel 430, and a second end 432 to which the at least one optoelectronic device 410 is connected.

The optical fiber 200 is terminated with the first portion 310 of the coupling device that plugs into the receptacle 320. Connector 310 and receptacle 320 provide alignment such that the at least one optical fiber 200 is aligned with the at least one optical waveguide 110 and allow for low loss coupling. Furthermore, the connector 310 provides repeated coupling of the at least one optical fiber 200 to the interposer 100.

FIG. 2 shows the arrangement of the interposer 100 and the substrate 400 including the at least one optoelectronic device 410, the at least one optical receiving/emitting element 420 and the at least one optical channel 430. The interposer 100 and the substrate 400 are arranged so that light coupled out of the at least one optical waveguide 110 at the second end 112 of the at least one optical waveguide 110 is coupled in the at least one optical receiving/emitting element 420 and/or light coupled out of the at least one optical receiving/emitting element 420 is coupled in the at least one optical waveguide 110 at the second end 112 of the at least one optical waveguide 110. The substrate/chip 400 may be arranged below the lower surface of the interposer 100. The substrate/chip 400 may for example be attached to the lower surface of the interposer 100.

According to the embodiment of the arrangement shown in FIG. 2, the second end 112 of the at least one optical waveguide 110 is cleaved by an angle to provide total internal reflection (TIR) at the end face 113 of the at least one optical waveguide 110 to reflect the light transferred in the at least one optical waveguide 110 via an optical pathway 101 in the material of the interposer towards the at least one receiving/emitting element 420 of the substrate. For this purpose, the interposer is cut/cleaved as shown in FIGS. 1A to 2 to provide a TIR area/cavity 102 in the surface of the interposer. One side of the cavity is slanted by the angle to provide total internal reflection at the end face 113 of the at least one optical waveguide 110.

The light coupled in the at least one optical receiving/emitting element 420, for example, a grating coupler or a photodiode, may be transferred via the at least one optical channel 430 to the at least one optoelectronic device 410, for example a photonic integrated circuit. The direction of the light may be bi-directional which means that the at least one optical receiving/emitting element 420, for example, the grating coupler or a VCSEL, may also be used for transmitting optical signals instead of receiving optical signals. In this case, the light will be coupled from the at least one receiving/emitting element 420 to the interposer 100, where it is directed into the waveguide 110, for example by total internal reflection. The light is then coupled from the at least one optical waveguide 110 into the at least one optical fiber 200 mounted to the edge of the interposer at the connector interface 300.

In case of using a grating coupler as optical receiving/emitting structure, for coupling to occur in a given direction, the light beam is not launched perpendicularly to the at least one receiving/emitting element 420 but at a predetermined angle, for example an angle of about 8°, in relation to the direction being perpendicular to the longitudinal direction of the at least one optical waveguide 110. The exact grating design of the at least one optical receiving/emitting element 420 will depend on a number of parameters including the wavelength, the mode shape of the at least one optical waveguide 110, the distance between the waveguide 110 and the grating structure of the at least one receiving/emitting element 420 etc. The slanted end face 113 of the at least one optical waveguide 110 may be made by an etching process or laser processing, which is very precise and can accommodate different angles to provide total internal reflection (TIR) as necessary.

According to another embodiment, the end face 113 may be coated by a reflective coating to reflect the light coupled out of the at least one optical waveguide 110 towards the grating structure of the at least one optical receiving/emitting element 420 or to reflect the light coupled out of the grating structure of the at least one optical receiving/emitting element 420 into the core of the at least one optical waveguide 110.

Depending on the relative sizes of and distances between the at least one optical waveguide 110, the interposer 100 and any substrates comprising the at least one optoelectronic device, for example the photonic integrated circuit, the light beam may expand in an optical pathway 101 to a size larger than the grating structure of the optical receiving/emitting element 420 when coupling the light from the at least one optical waveguide to the at least one optoelectronic device, or the light beam may expand to a size larger than the diameter of the at least one optical waveguide 110 when coupling light from the grating structure of the at least one receiving/emitting element 420 to the interposer 100. In order to provide high coupling efficiency, an additional optical lens 130 may be provided in the material of the interposer arranged in the optical pathway 101 of the light to focus the light.

According to the embodiment of the arrangement shown in FIG. 3, the arrangement comprises an optical lens 130 being arranged within the material of the interposer 100 in the optical pathway 101 of the light. The second end 112 of the at least one optical waveguide 110 is configured such that the light coupled in the at least one optical waveguide from the at least one optical fiber 200 is reflected at the end face 113 of the at least one optical waveguide 110 at the second end 112 of the at least one optical waveguide to be transferred through the optical pathway 101 and the optical lens 130 towards the substrate 400.

The optical lens 130 is configured to focus the light towards the receiving/emitting element 420 of the substrate 400. In order to enable coupling light from the at least one optoelectronic device, for example a photonic integrated circuit, in the least one optical waveguide 110, the optical lens 130 may be configured to focus the light incident to the optical lens 130 from the at least one receiving/emitting element 420 towards the at least one optical waveguide 110. The optical lens may be fabricated by an ion exchange or laser inscription processes.

To achieve high coupling efficiencies between the at least one optical fiber, the at least one optical waveguide and the optical receiving/emitting element, not only the SM mode fields need to be adjusted to each other, but also the polarization has to be controlled as the optical receiving/emitting element, for example a grating coupler, is very polarization-sensitive.

According to an embodiment of the arrangement, the at least one optical receiving/emitting element 420 may be configured to receive/emit light having a first polarization P1 with a lower loss than light having a second polarization P2. According to the embodiment of the at least one optical waveguide 110 of the interposer 100, the at least one optical waveguide 110 may be configured to select from the polarizations of the light coupled in the at least one optical waveguide 110 at the first end 111 of the waveguide a first polarization P1 such that the light coupled out at the second end 112 of the at least one optical waveguide 110 has the first polarization P1 and/or to select from the polarizations of the light coupled in the at least one optical waveguide 110 at the second end 112 a second polarization P2 such that the light coupled out at the first end 111 of the at least one optical waveguide 110 has the second polarization P2 being different from the first polarization P1.

According to the embodiment shown in FIG. 4, the cross-section of the at least one optical waveguide 110 is changed, for example adiabatically changed, along the longitudinal direction of the at least one optical waveguide such that the first polarization P1 of the polarizations of the light coupled in the at least one optical waveguide 110 at the first end 111 is selected such that the light coupled out at the second end 112 of the at least one optical waveguide 110 has the first polarization P1 and/or the second polarization P2 of the polarizations of the light coupled in the at least one optical waveguide 110 at the second end 112 is selected such that the light coupled out at the first end 111 of the at least one optical waveguide has the second polarization P2. One of the axis of the cross-section of the optical waveguide is lengthened, whereas another axis of the cross-section being arranged in the plane of the cross-section perpendicular to the lengthened axis is shortened or remains constant.

By changing, for example adiabatically adjusting, the cross-section of the at least one optical waveguide 110, i.e. the core 116 of the at least one optical waveguide, along its longitudinal direction within the material of the interposer, the polarization of the mode of light transferred within the core of the optical waveguide is selected. FIG. 4 schematically shows a slow change of a shape of the core 116 of the at least one optical waveguide 110 from a square or circular cross-section to a rectangular or elliptical cross-section that supports only one polarization, where the specific polarization needs to be adjusted to the requirements of the grating structure of the receiving/emitting element, for example the grating coupler. In the proposed design, the reflection of the light is polarization-dependent, so that the angle at which total internal reflection (TIR) occurs has to be adjusted to account for the polarization of the light.

The principle to select the polarization of the light by a change, for example an adiabatic change, of the cross-section of the core 116 of the optical waveguide 110 may by supported by additional features that ensure cut-off of other polarizations. For this purpose, air-filled round trenches, passageways or holes may be arranged within the material of the interposer along the lengthened dimension of the core of the at least one optical waveguide, as shown in FIGS. 5A and 5B.

According to the embodiment of the arrangement shown in FIGS. 5A and 5B, the interposer 100 may comprise air-filled passageways 120 being arranged in a cladding 115 of the at least one optical waveguide 110 next to the core section 116 of the at least one optical waveguide along the longitudinal direction of the at least one optical waveguide. The selection of polarization may be supported by adding air-filled holes/passageways 120 next to the core 116 along the longitudinal direction of the optical waveguide. Two air holes/passageways 120 may be arranged in the cladding 115 of the optical waveguide on both sides of the core 116 of the optical waveguide symmetrically to the lengthened axis of the core of the optical waveguide.

According to the embodiment shown in FIG. 5A, the circular cross-section of the optical core 116 of the at least one optical waveguide is changed to an elliptical shape. A first and a second air hole/passageway 120 are arranged symmetrically on both sides of the lengthened axis of the cross-section of the core 116 of the optical waveguide. According to the embodiment shown in FIG. 5B, a square cross-section of the core 116 of the optical waveguide is changed along the longitudinal direction of the optical waveguide from the first end 111 to the second end 112 of the optical waveguide to a rectangular shape.

Figure 6:
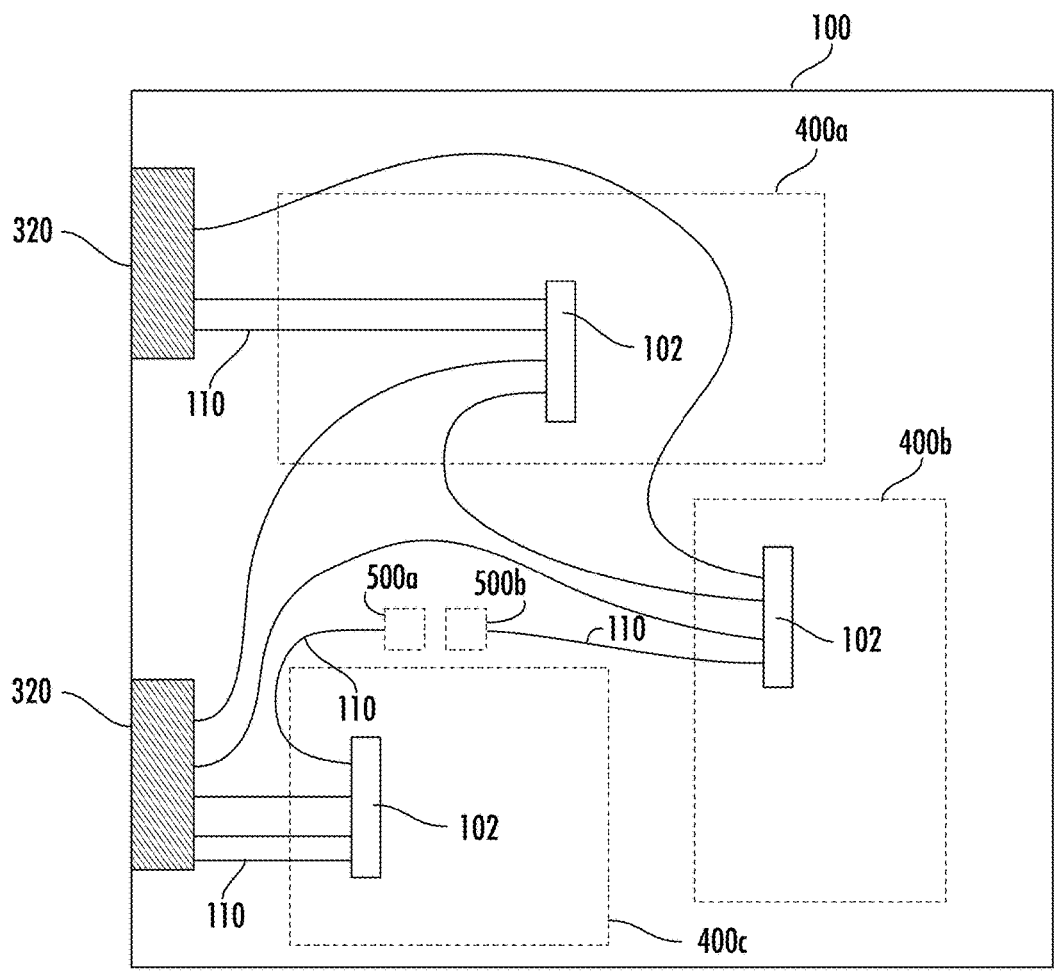
FIG. 6 shows a layout of an interposer coupled to multiple substrates respectively including at least one optoelectronic device.

FIG. 6 shows an example of a layout of the interposer 100 being coupled to a plurality of substrates/chips 400a, 400b and 400c which may be arranged below the interposer 100. The interposer 100 comprises coupling devices 300 arranged at the edge of the interposer 100. The coupling devices 300 may be configured as receptacles 320. Optical fibers may be connected by the coupling devices 300 to waveguides 100 in the material of the interposer 100. Optical signals coupled from the optical fibers in the optical waveguides 100, for example waveguide arrays, may be transferred to the receiving/emitting elements 420 of the substrates 400 by total internal reflection at the respective end faces 113 of the optical waveguides at the area 102 of the interposer.

The light coupled out of the optical waveguides 110 and received by the respective grating couplers 420 of the substrates 400 may be transferred to photonic integrated circuits of the substrates 400a, 400b, 400c. Other optoelectronic components 500a, 500b, such as VECSELs or photodiodes, may also be coupled to the interposer 100. Light may be coupled from the VECSEL 500a via an optical waveguide 110 to the area 102 at which the light is reflected towards a grating coupler of the substrate/chip 400c by total internal reflection. Furthermore, optical signals may be transferred from an optoelectronic device of the substrate/chip 400b to a grating coupler of the substrate 400b and coupled into an optical waveguide of the interposer 100 by total internal reflection. The light is transferred through an optical waveguide 110 to a photodiode 500b.

The embodiment of the layout of the interposer shown in FIG. 6 allows signals to be coupled from a waveguide array to at least one grating structure of a receiving/emitting element, for example, a grating coupler array by total internal reflection at the areas 102 of the interposer 100. Furthermore, connections between single waveguides and single grating couplers or optoelectronic elements are also possible.

When designing the interposer 100 and the optical channels 430 of the substrate 400 for both polarization directions, the optical waveguides and the optical channels may be applied such that at least no power is lost due to the polarization sensitivity of the grating structure of the receiving/emitting element, for example the grating couplers. FIG. 7 shows an embodiment of the arrangement of an interposer 100 and a substrate 400, wherein the substrate 400 comprises a first one of the at least one receiving/emitting element 421 to be configured to receive/emit light having a first polarization P1 with a lower loss than light having a second polarization P2. The substrate 400 may comprise a second one of the at least one receiving/emitting element 422 to be configured to receive/emit light having the second polarization P2 with a lower loss than light having the first polarization P1.

The at least one optical waveguide 100 may comprise a first section 110a, a second section 110b and a third section 110c. The at least one optical waveguide 100 may comprise a third end 113 and a splitting node 114 at which the first section 110a is split in the second and third section 110b, 110c. The first section 110a of the at least one optical waveguide 110 extends within the interposer 100 from the first end 111 of the at least one optical waveguide to the splitting node 114. The second section 110b of the at least one optical waveguide 110 extends within the material of the interposer 100 from the splitting node 114 to the second end 112 of the at least one optical waveguide 110. The third section 110c of the at least one optical waveguide 110 extends within the interposer 100 from the splitting node 114 to the third end 113 of the at least one optical waveguide 110. The second end 112 of the at least one optical waveguide 110 is configured to couple the light in/out of the second section 110b of the at least one optical waveguide. The third end 113 of the at least one optical waveguide is configured to couple the light in/out of the third section 110c of the at least one optical waveguide.

The interposer 100 and the substrate 400 are arranged so that light coupled out of the second section 110b of the at least one optical waveguide at the second end 112 is coupled in the first optical receiving/emitting element 421 and/or light coupled out of the first optical receiving/emitting element 421 is coupled in the second section 110b of the at least one optical waveguide at the second end 112.

The interposer 100 and the substrate 400 are further arranged so that light coupled out of the third section 110c of the at least one optical waveguide at the third end 113 is coupled in the second optical receiving/emitting element 422 and/or light coupled out of the second optical receiving/emitting element 422 is coupled in the third section 110c of the at least one optical waveguide 110 at the third end 113.

According to the coupling structure shown in FIG. 7, optical fibers are coupled to the interposer 100 at the receptacle 320 and the light is coupled into the waveguides 110. The first section 110a of the waveguide 100 is split into two separate sections 110b and 110c of the waveguide at the splitting node 114. The cross-section of the second section 110b of the optical waveguide 110 may change, for example adiabatically change, between the splitting node 114 and the second end 112 of the optical waveguide 110 so that a first polarization P1 of the polarizations of the light coupled in the second section 110b of the optical waveguide at the splitting node 114 is selected in the way that the light coupled out at the second end 112 of the optical waveguide has the first polarity P1. The light is transferred from the second section 110b of the optical waveguide to the first receiving/emitting element 421.

The second section 110b of the optical waveguide 110 is coupled to the first receiving/emitting element 421. The cross-section of the third section 110c of the optical waveguide 110 may change, for example adiabatically change, between the splitting node 114 and the third end 113 of the optical waveguide 110 so that a second polarization P2 of the polarizations of the light coupled in the third section 110c of the optical waveguide at the splitting node 114 is selected in the way that the light coupled out at the third end 113 of the optical waveguide has the second polarity P2. The light is transferred from the third section 110c of the optical waveguide to the second receiving/emitting element 422.

According to the embodiment shown in FIG. 7, the at least one optical channel 430 comprises a first path 430a, a second path 430b and a third path 430c. The at least one optical channel 430 further comprises a third end 433 and a merging node 434 at which the first and the third path 430a, 430c of the optical channel merge to the second path 430b. The first path 430a of the at least one optical channel extends from the first end 431 of the at least one optical channel to the merging node 434. The first end 431 of the at least one optical channel is connected to the first receiving/emitting element 421. The second path 430b of the at least one optical channel extends from the merging node 434 to the second end 432 of the at least one optical channel. The third path 430c of the at least one optical channel extends from the third end 433 of the at least one optical channel to the merging node 434. The third end 433 of the at least one optical channel is connected to the second receiving/emitting element 422.

The first and third section 430a, 430c of the optical channel meet at junction/merging node 434, from where the single second section 430b of the optical channel meets the functional structure/optoelectronic device 410. The described trajectory between the optoelectronic device 410 and the first section 110a of the optical waveguide 110 may also be followed in the opposite direction.

To preserve signal integrity, it has to be ensured that the optical path length of the separate signals is of substantially equal length so that the length of the optical path comprising the second section 110b of the optical waveguide, the pathway 101 between the end face of the second section 110b of the optical waveguide and the first optical receiving/emitting element 421, and the first section 430a of the optical channel 430 equals the length of the optical path comprising the third section 110c of the optical waveguide, the optical pathway 101 between the end face of the third section 110c of the optical waveguide and the receiving/emitting element 422, and the third section 430c of the optical channel 430.

As described above, the second and the third section 110b, 110c of the optical waveguide 110 may be configured to select the polarization of the light such that light coupled out at the end face of the second section 110b of the optical waveguide 110 has the first polarization P1, and light coupled out of the third section 110c of the optical waveguide 110 has the second polarization P2. The cross-section of the respective core of the second and the third section 110b, 110c of the optical waveguide may change between the splitting node 114 and the end of the second section 110b of the optical waveguide as well as between the splitting node 114 and the end of the third section 110c of the optical waveguide in a different manner.

In order to receive/emit the light with the different polarities with low loss, the first and the second optical receiving/emitting element 421, 422 are arranged on the surface of the substrate 400 and turned by an angle in relation to each other. By way of example, the turning of the signal may be by an angle of about 90°.

Figure 8A:
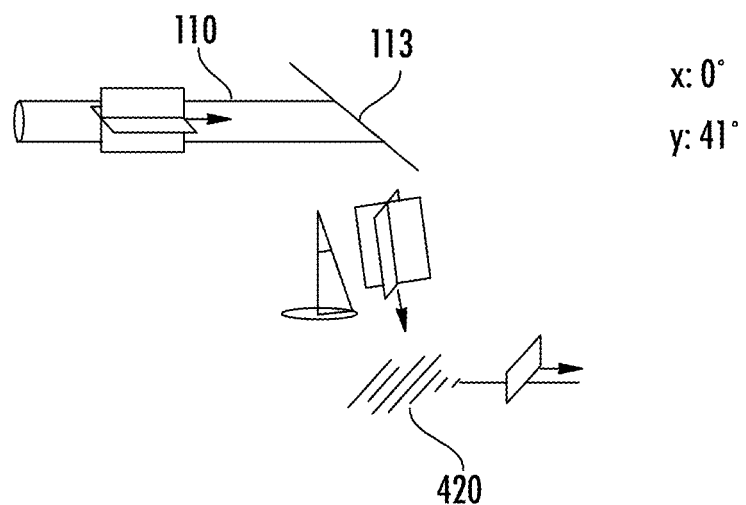
FIGS. 8A and 8B show the coupling of light from an optical waveguide of the interposer to an optical receiving/emitting element being oriented in different directions on a surface of a substrate.
Figure 8B:
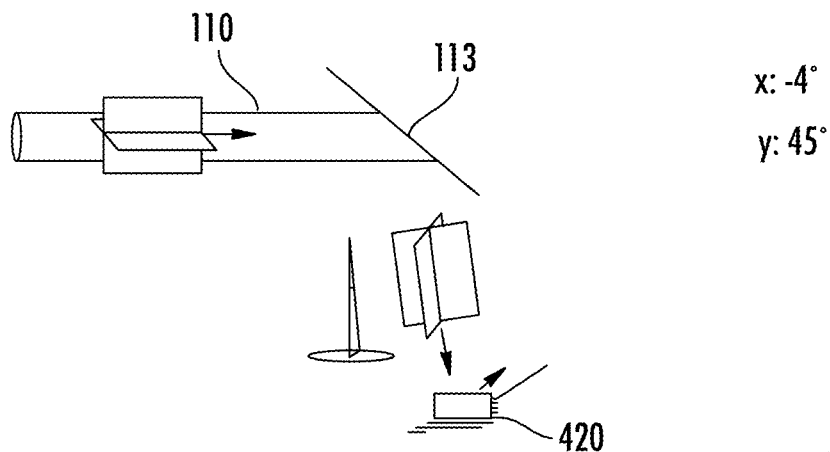

FIGS. 8A and 8B show how low-loss coupling of the different polarizations from an optical waveguide 110 to an optical receiving/emitting element 420 may be ensured by adapting the orientation of the grating structure of the optical receiving/emitting element and the inclination of the end face 113 of the optical waveguide 110, i.e. the TIR mirror. According to FIG. 8A, the light is reflected towards the optical receiving/emitting element 420 by means of a cleaved end face 113 of the optical waveguide having an inclination in the y-direction perpendicular to the longitudinal direction of the optical waveguide of y=41° and in the x-direction being perpendicular to the y-direction by x=0° so that the direction of the light makes an angle of 8° with the normal to optimally couple the light to the substrate/chip 400. Due to the arrangement of the grating structure of the optical receiving/emitting element 420 only the transverse electric (TE) mode is coupled into the optical channel 430, whereas the transverse magnetic (TM) mode does not couple to the optical channel 430.

According to the embodiment shown in FIG. 8B the grating structure of the optical receiving/emitting element 420 is rotated in comparison to the grating structure of the optical receiving/emitting element 420 of FIG. 8A by about 90° and the orientation of the TIR mirror at the end face 113 of the optical waveguide is modified to only couple the TM mode to the optical receiving/emitting element 420. The end face 113 of the optical waveguide is cleaved in the y-direction by y=45° and in the x-direction by x=4°. That means that the TIR mirror is at 45° in the direction perpendicular to the longitudinal direction of the waveguide and angled around 4° in the direction perpendicular to the y-direction.

By providing the end face 113 of the second section 110b of the optical waveguide with a TIR mirror as shown in FIG. 8A and by arranging the grating structure of the first optical receiving/emitting element 421 as shown in FIG. 8A, and by providing the end face 113 of the third section 110c of the optical waveguide and the orientation of the grating structure of the second optical receiving/emitting element 422 as shown in FIG. 8B, both polarizations, i.e. the TE mode and the TM mode may be coupled to the optoelectronic device 410.

According to a method to manufacture the arrangement for coupling the at least one optical fiber 200 to the at least one optoelectronic device 410, the interposer 100 may be provided containing the at least one optical waveguide 110 that is matched to the mode field of the at least one optical fiber 200. For coupling the optoelectronic device 410, for example a photonic integrated circuit, through the receiving/emitting element 420, for example a grating coupler, to the at least one optical fiber 200, the at least one optical waveguides 110 is required to be single mode.

Fabrication of single mode waveguides within the material of the interposer 100 may be achieved through ion-exchange processes, where the surface of the interposer is bombarded by ions that locally change the refractive index of the material of the interposer, for example the glass of the interposer 100, followed by a diffusion process through which the optical waveguide 110 is buried inside the interposer 100. A second method of the fabrication the at least one optical waveguide 110 is the direct writing of the at least one optical waveguide in the material, for example the glass, of the interposer 100 with a femtosecond laser. By careful choice of the process parameters, for example the width of the traces in the mask for the ion bombardment and the subsequent diffusion time or the size of the laser-written waveguide, the waveguide may be made to be single mode at the desired wavelength, so that it may be coupled both to an SM fiber and a photonic integrated circuit.

After providing the interposer 100 with the receptacle 320 and the at least one optical waveguide 110, and the substrate 400 with the at least one optoelectronic device 410, for example the photonic integrated circuit, the at least one optical receiving/emitting element 420 and the at least one optical channel 430, the interposer 100 and the substrate 400 have to be aligned so that light may be coupled between the at least one optical waveguide 110 and the at least one optoelectronic device 410 with low loss.

Figure 9:
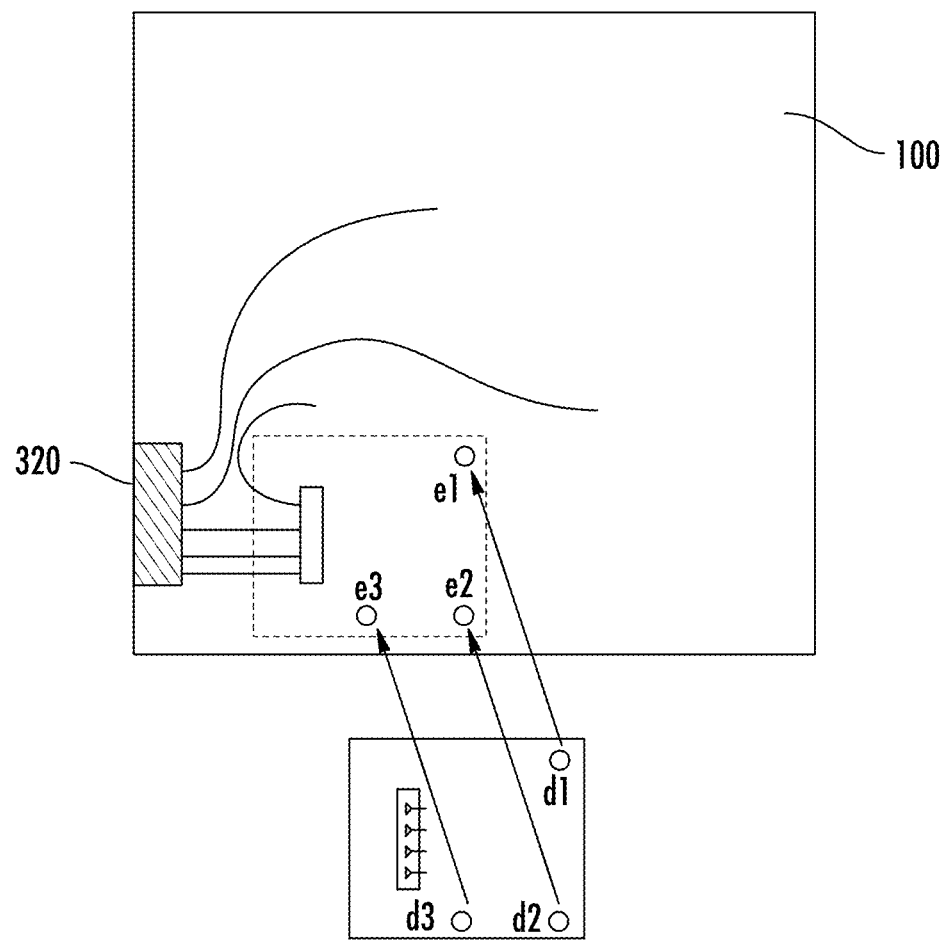
FIG. 9 shows an alignment of a substrate including at least one optoelectronic device to an interposer.

The alignment of the structures may be done, as shown in FIG. 9, by aligning each substrate/chip 400 with respect to an interposer 100 to which it has to be coupled separately with the use of fiducials as shown in FIG. 9. The interposer 100 with the receptacle 320 may comprise a number of fiducials e1, e2 and e3 to which the substrate 400 comprising the fiducials d1, d2 and d3 is aligned. Alignment of the fiducials d1, d2 and d3 of the substrate/chip 400 to the fiducials e1, e2 and e3 of the interposer 100 guarantees that the optical receiving/emitting element of the substrate/chip 400 is correctly aligned to the area 102 providing TIR.

Figure 10:
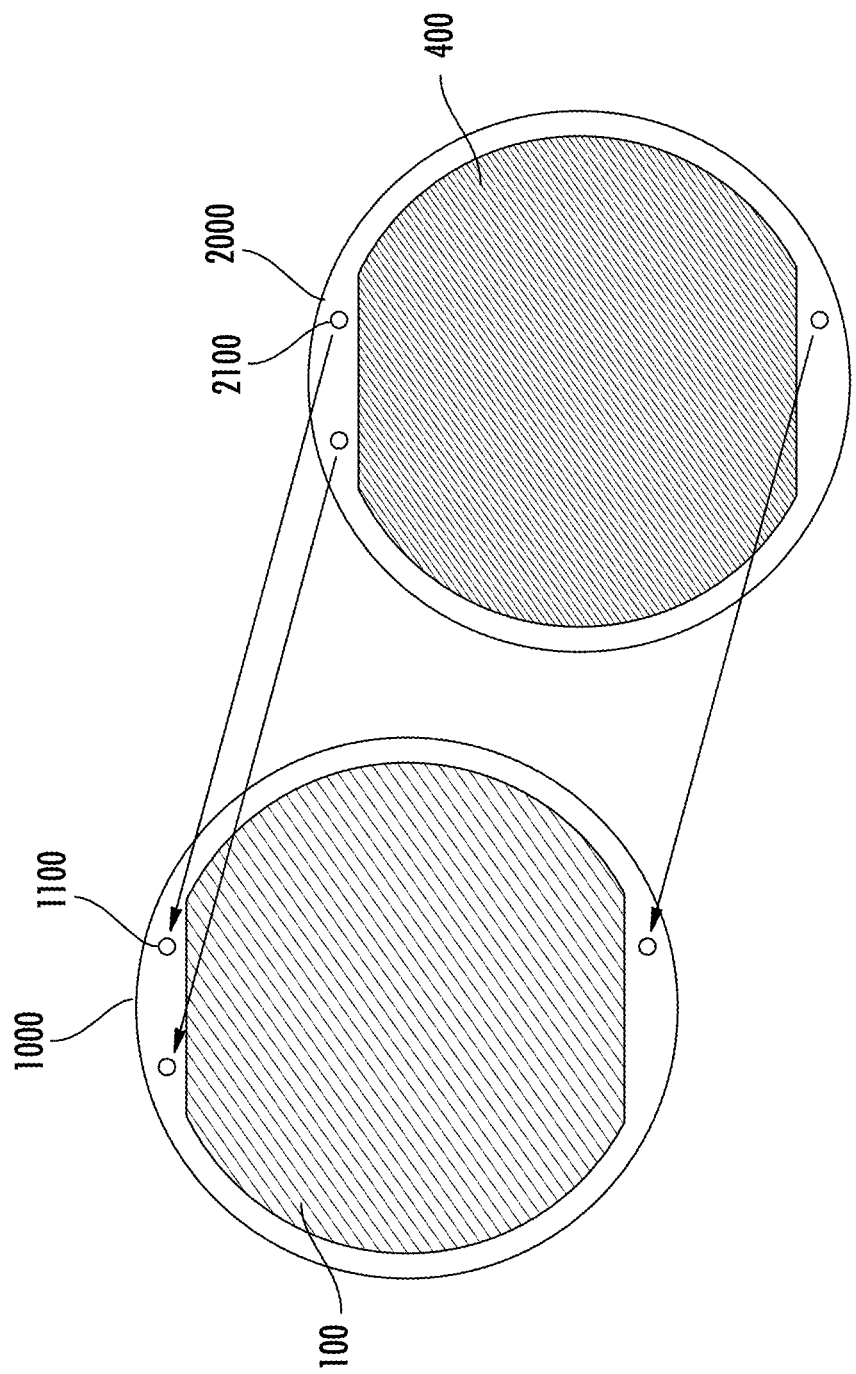
FIG. 10 shows the alignment of a first wafer comprising a plurality of interposers and a second wafer comprising a plurality of substrates including at least one optoelectronic device.
Figure 11:
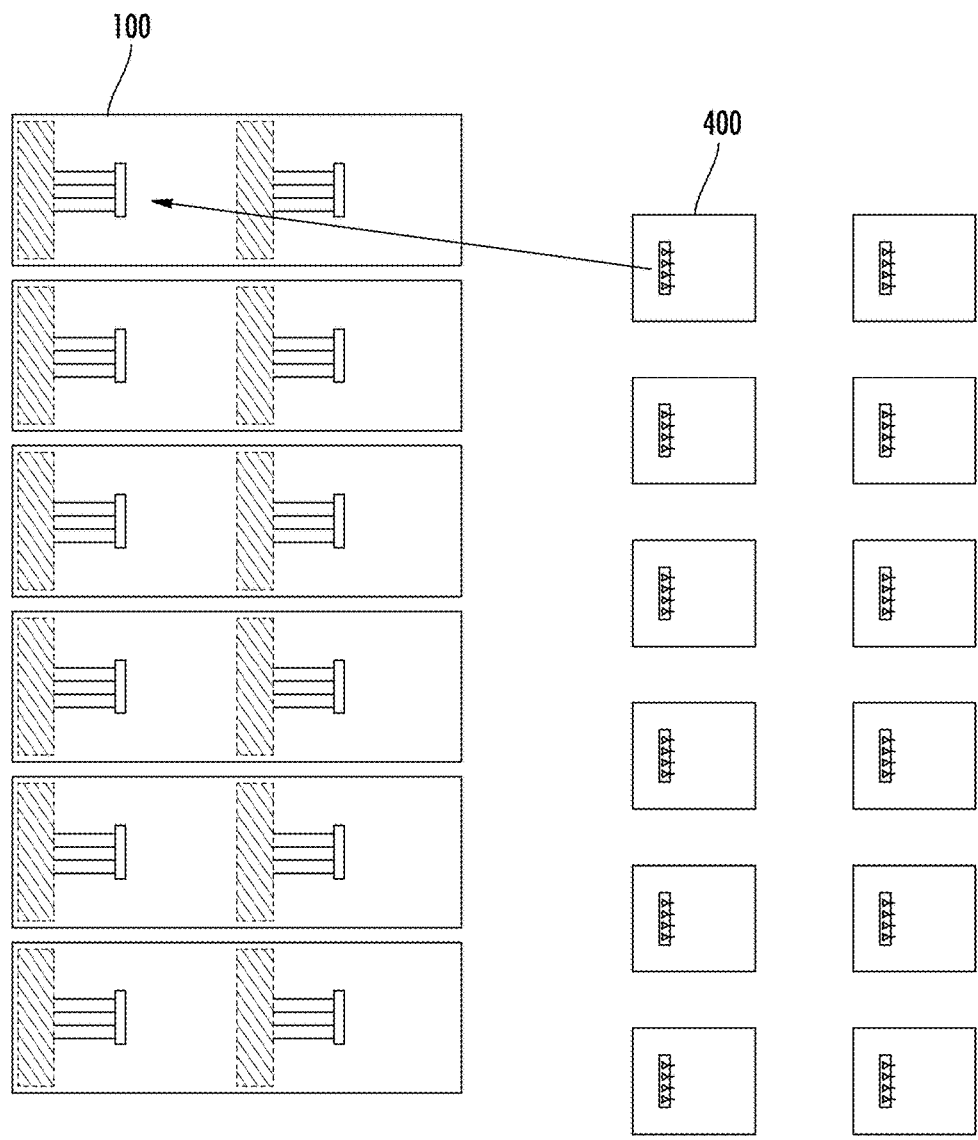
FIG. 11 shows a plurality of interposers arranged on a first wafer and a plurality of optical receiving/emitting elements arranged on a second wafer to be aligned to each other.

Another method of manufacturing the arrangement for coupling the at least one optical fiber 200 to the at least one optoelectronic device 410 is shown in FIGS. 10 and 11. According to the method of FIGS. 10 and 11, a first wafer 1000 comprising at least one first fiducial 1100 and a plurality of interposers 100, as shown in FIG. 11 on the left side, is provided. Furthermore, a second wafer 2000 comprising at least one second fiducial 2100 and a plurality of substrates 400, as shown in FIG. 11 on the right side, is provided.

According to the manufacturing method of FIGS. 10 and 11, the first wafer 1000 and the second wafer 2000 are aligned by means of the at least one first fiducial 1100 and the at least one second fiducial 2100 such that a respective one of the plurality of interposers 100 of the first wafer 1000 and a respective one of the plurality of substrates 400 of the second wafer 2000 are arranged so that light coupled out of the at least one optical waveguide 110 of the respective one of the plurality of interposers 100 at the second end 112 of the at least one optical waveguide 110 is coupled in the at least one optical receiving/emitting element 420 of the respective one of the plurality of substrates 400 and/or light coupled out of the at least one optical receiving/emitting element 420 of the respective one of plurality of substrates 400 is coupled in the at least one optical waveguide 110 of the respective one of the plurality of interposers 100 at the second end 112 of the at least one optical waveguide 110. A pair of the respective one of the plurality of interposers 100 and the respective one of the plurality of substrates 400 is singularized from the wafer stack comprising the first and the second wafer.

In contrast to the separate alignment and attachment of components as shown in FIG. 9, the alternative method described with reference to FIGS. 10 and 11 provides an alignment of the components on the wafer level. Both the interposers 100 and the substrates 400 may be fabricated on the wafer level which includes manufacturing steps like masking, ion exchanging, laser writing, and etching. The manufacturing of the optical waveguides and the TIR structure is done by wafer-level processes, for example, by ion exchange processes or laser writing processes. When both of the first and second wafer 1000, 2000 have been finished, the alignment and attachment may be done with high precision for full wafers as shown in FIG. 10. This ensures that all parts on both wafers are aligned to each other. Since a large number of components is aligned in a single step, this is a very low cost process.

The arrangement to couple the at least one optical fiber 200 to the at least one optoelectronic device 410 comprising the interposer 100 including the at least one optical waveguide 110 and the substrate 400 comprising the at least one optoelectronic device 410, for example the photonic integrated circuit, has several advantages. One of the advantages is the extension to multi-fiber coupling, because all of the elements may accommodate structures for more than one path of light. While the optical connector 310 is the only element to explicitly contain fibers, both the interposer 100 and the substrate 400 may contain multiple waveguides for receive (RX) and transmit (TX) processes.

The arrangement allows passive alignment via a mechanical interface, including a connector 310, for example a MT-(physical contact) or MXC-like (expanded beam) connector, and a receptacle 320. The receptacle 320 allows repeated mating by allowing pluging and unplugging of the connector 310 without having to break and realign any adhesive bonds. The TIR element 102 accommodates an angle of incidence for the substrate, for example an angle of about 8°. The polarization of the light from the at least one optical fiber to the substrate 400 is controlled within the interposer 100, thus simplifying the grating design on a chip. All elements of the arrangement may be designed without knowledge of the exact fiber design. The interposer provides a universal interface for coupling multiple substrates of photonic integrated circuits. Different photonic integrated circuits may be connected with the same interposer without the need to individually align fibers. The arrangement allows coupling an optical fiber to nearly any location on a chip, not just the edge.

We claim:

1. An arrangement for coupling at least one optical fiber to at least one optoelectronic device, comprising:
    an interposer comprising at least one optical waveguide having a first end to be optically coupled to the at least one optical fiber and a second end;
    a coupling device to mechanically couple the at least one optical fiber to the interposer for aligning the at least one optical fiber to the at least one optical waveguide for optically coupling the at least one optical fiber and the at least one optical waveguide;
    wherein a first portion of the coupling device is provided at an end of the at least one optical fiber and a second portion of the coupling device is disposed at the interposer such that the at least one optical fiber can be optically coupled to an edge of the interposer when the first portion of the coupling device is mechanically coupled to the second portion of the coupling device,
    wherein the second end of the at least one optical waveguide is configured to optically couple a substrate comprising the at least one optoelectronic device to the at least one optical waveguide;
    at least one optical receiving/emitting element and at least one optical channel comprising a first end being optically connected to the at least one optical receiving/emitting element for optically coupling the at least one optical channel and a second end, wherein the at least one optoelectronic device is optically connected to the second end of the at least one optical channel; and
    wherein:
        the interposer and the substrate are arranged for optically coupling the at least one optical waveguide at the second end to the at least one optical receiving/emitting element;
        the at least one optical receiving/emitting element is configured to receive/emit light having a first polarization with a lower loss than light having a second polarization, and the at least one optical waveguide is configured to select a first one of the polarizations of the light coupled in the at least one optical waveguide at the first end such that the light coupled out at the second end of the optical waveguide has the first polarization and/or to select a second one of the polarizations of the light coupled in the at least one optical waveguide at the second end such that the light coupled out at the first end of the at least one optical waveguide has the second polarization being different from the first polarization; and
        the cross-section of the at least one optical waveguide is changed along the longitudinal direction of the at least one optical waveguide such that the first polarization of the polarizations of the light coupled in the at least one optical waveguide at the first end is selected such that the light coupled out at the second end of the at least one optical waveguide has the first polarization and/or the second polarization of the polarizations of the light coupled in the at least one optical waveguide at the second end is selected such that the light coupled out at the first end of the at least one optical waveguide has the second polarization.

2. The arrangement of claim 1, wherein the interposer comprises one or more passageways being arranged in a cladding of the at least one optical waveguide adjacent to a core section of the at least one optical waveguide along the longitudinal direction of the at least one optical waveguide.

3. The arrangement of claim 1, further comprising:
    an optical lens;
    wherein the second end of the at least one optical waveguide is configured to optically couple the at least one optical waveguide from the at least one optical fiber and reflect light at an end face of the at least one optical waveguide to an optical pathway of the interposer towards the substrate, and the optical lens being arranged within the material of the interposer in the optical pathway of the light.

4. The arrangement of claim 1, wherein the at least one optoelectronic component is configured as a photonic integrated circuit, and the at least one optical receiving/emitting element is configured as a grating coupler.

5. The arrangement of claim 1, wherein the second end of the at least one optical waveguide is cleaved by an angle to reflect light in the at least one optical waveguide through the optical pathway to the at least one optical receiving/emitting element.

6. The arrangement of claim 1, wherein the substrate comprises a first one of the at least one optical receiving/emitting element to be configured to receive/emit light having the first polarization with a lower loss than light having the second polarization, and a second one of the at least one optical receiving/emitting element to be configured to receive/emit light having the second polarization with a lower loss than light having the first polarization.

7. The arrangement of claim 6, wherein the at least one optical waveguide comprises a first section, a second section, a third section and a third end, and the at least one optical waveguide comprises a splitting node at which the first section is split in the second and third section, wherein the first section of the at least one optical waveguide extends within the interposer from the first end of the at least one optical waveguide to the splitting node;
- wherein the second section of the at least one optical waveguide extends within the interposer from the splitting node to the second end of the at least one waveguide;
- wherein the third section of the at least one optical waveguide extends within the interposer from the splitting node to the third end of the at least one optical waveguide;
- wherein the second end of the at least one optical waveguide is configured to optically couple the second section of the at least one optical waveguide and the third end of the at least one optical waveguide is configured to optically couple to the third section of the at least one optical waveguide.

8. The arrangement of claim 7, wherein the interposer and the substrate are arranged to optically couple the second section of the at least one optical waveguide at the second end of the at least one optical waveguide to the first optical receiving/emitting element; and
- wherein the interposer and the substrate are arranged so that optical coupling of the third section of the at least one optical waveguide at the third end of the at least one optical waveguide is coupled in the second optical receiving/emitting element.

9. The arrangement of claim 6, wherein the at least one optical channel comprises a first path, a second path, a third path and a third end;
- wherein the at least one optical channel comprises a merging node at which the first and the third path merge to the second path;
- wherein the first path of the at least one optical channel extends from the first end of the at least one optical channel to the merging node of the at least one optical channel, wherein the first end of the at least one optical channel is connected to the first optical receiving/emitting element;
- wherein the second path of the at least one optical channel extends from the merging node to the second end of the at least one optical channel;
- wherein the third path of the at least one optical channel extends from the third end of the at least one optical channel to the merging node of the at least one optical channel, wherein the third end of the at least one optical channel is connected to the second optical receiving/emitting element.

10. The arrangement of claim 6, wherein the first and the second optical receiving/emitting elements are respectively configured as a grating coupler; and
- wherein the first and the second optical receiving/emitting elements are arranged on a surface of the substrate and turned by 90° against each other.

11. The arrangement of claim 1, wherein the first portion of the coupling device is configured as one of a MT ferrule-based connector and a lensed-based connector, and the second portion of the coupling device is configured as a receptacle.

12. A method to manufacture an arrangement for coupling at least one optical fiber to at least one optoelectronic device, comprising:
- providing a first wafer comprising a plurality of the interposers each comprising at least one optical waveguide, and at least one first fiducial, wherein:
  - the at least one optical waveguide of each of the plurality of the interposers is configured to select a first one of polarizations of light coupled in the at least one optical waveguide at a first end such that the light coupled out at a second end of the optical waveguide has the first polarization and/or to select a second one of the polarizations of the light coupled in the at least one optical waveguide at the second end such that the light coupled out at the first end of the at least one optical waveguide has the second polarization being different from the first polarization, and
  - the at least one optical waveguide of each of the plurality of interposers comprises a cross-section that is changed along the longitudinal direction of the at least one optical waveguide such that the first polarization of the polarizations of the light coupled in the at least one optical waveguide at the first end is selected such that the light coupled out at the second end of the at least one optical waveguide has the first polarization and/or the second polarization of the polarizations of the light coupled in the at least one optical waveguide at the second end is selected such that the light coupled out at the first end of the at least one optical waveguide has the second polarization;
- providing a second wafer comprising a plurality of the substrates and at least one second fiducial;
- aligning the first wafer and the second wafer by means of the at least one first fiducial and the at least one second fiducial such that a respective one of the plurality of interposers of the first wafer and a respective one of the plurality of substrates of the second wafer are arranged so that light coupled out of the at least one optical waveguide of the respective one of the plurality of interposers at the second end of the at least one optical waveguide is coupled to at least one optical receiving/emitting structure of the respective one of the plurality of substrates and/or light coupled out of the at least one optical receiving/emitting element of the respective one of the plurality of substrates is coupled in the at least one optical waveguide of the respective one of the plurality of interposers at the second end of the at least one optical waveguide, wherein the at least one optical receiving/emitting element is configured to receive/emit light having the first polarization with a lower loss than light having the second polarization of the respective one of the plurality of substrates;
- singularizing a pair of the respective one of the plurality of interposers and the respective one of the plurality of substrates to provide the arrangement.

13. The method of claim 12, further comprising providing the at least one optical waveguide of the respective one of the interposers selected from one of an ion exchange process and a writing process with a femtosecond laser.

14. An interposer assembly, comprising:
- an interposer comprising at least one optical waveguide having a first end and a second end;
- a substrate being in optical communication with the interposer, the substrate comprising at least one optoelectronic device, at least one optical receiving/emitting element and at least one optical channel comprising a first end in optical communication with the at least one optical receiving/emitting element and a second end in optical communication with the at least one optoelectronic device;
- wherein:
  - a cross-section of the at least one optical waveguide of the interposer changes along a longitudinal direction of the at least one optical waveguide such that the first end has a first polarization of light and the second end has a second polarization of light;

the at least one optical receiving/emitting element comprises a first optical receiving/emitting element configured to receive/emit light having the first polarization, and a second optical receiving/emitting element to be configured to receive/emit light having the second polarization, wherein the first polarization provides a lower loss of light than the second polarization;

wherein the at least one optical waveguide of the interposer comprises a first section, a second section, a third section and a third end;

a splitting node at which the first section is split into the second section and third section, wherein the first section of the at least one optical waveguide extends within the interposer from the first end of the at least one optical waveguide to the splitting node;

wherein the second section of the at least one optical waveguide extends within the interposer from the splitting node to the second end of the at least one waveguide; and wherein the third section of the at least one optical waveguide extends within the interposer from the splitting node to the third end of the at least one optical waveguide.

15. The interposer assembly of claim 14, wherein the at least one optical receiving/emitting element is configured to receive/emit light having the first polarization with a lower loss than light having the second polarization.

16. The interposer assembly of claim 14, wherein the interposer comprises one or more passageways arranged in a cladding of the at least one optical waveguide along the longitudinal direction of the at least one optical waveguide.

17. The interposer assembly of claim 14, further comprising:

an optical lens, wherein the optical lens is arranged in an optical pathway of the interposer; and the second end of the at least one optical waveguide has a reflection surface at an end face.

18. The interposer assembly of claim 14, wherein the at least one optoelectronic component is a photonic integrated circuit, and the at least one optical receiving/emitting element is a grating coupler.

19. The interposer assembly of claim 14, wherein the second end of the at least one optical waveguide is cleaved by an angle.

20. The interposer assembly of claim 14, wherein the interposer and the substrate are arranged so that light coupled out of the second section of the at least one optical waveguide at the second end of the at least one optical waveguide is coupled in the first optical receiving/emitting element and/or light coupled out of the first optical receiving/emitting element is coupled in the second section of the at least one optical waveguide at the second end of the at least one optical waveguide;

wherein the interposer and the substrate are arranged so that light coupled out of the third section of the at least one optical waveguide at the third end of the at least one optical waveguide is coupled in the second optical receiving/emitting element and/or light coupled out of the second optical receiving/emitting element is coupled in the third section of the at least one optical waveguide at the third end of the at least one optical waveguide.

21. The interposer assembly of claim 14, wherein the at least one optical channel of the substrate comprises a first path, a second path, a third path and a third end;

wherein the at least one optical channel comprises a merging node at which the first path and the third path merge to the second path;

wherein the first path of the at least one optical channel extends from the first end of the at least one optical channel to the merging node of the at least one optical channel, and the first end of the at least one optical channel is connected to the first optical receiving/emitting element;

wherein the second path of the at least one optical channel extends from the merging node to the second end of the at least one optical channel;

wherein the third path of the at least one optical channel extends from the third end of the at least one optical channel to the merging node of the at least one optical channel, and wherein the third end of the at least one optical channel is connected to the second optical receiving/emitting element.

22. The interposer assembly of claim 14, wherein the first optical receiving/emitting element and the second optical receiving/emitting element are respectively configured as a grating coupler, and the first optical receiving/emitting element and the second optical receiving/emitting element are arranged on a surface of the substrate and turned by an angle against each other.

23. The interposer assembly of claim 14, further comprising a coupling device attached to the interposer, the coupling device used for optically coupling to the first end of the interposer, wherein the coupling device comprises a first portion, and the first portion is configured as one of a MT ferrule-based connector and a lensed-based connector; and wherein a second portion of the coupling device is configured as a receptacle.

* * * * *